(12) United States Patent
Weisz (10) Patent No.: US 6,863,141 B2
(45) Date of Patent: Mar. 8, 2005

(54) ELECTRIC WHEELCHAIR DRIVE SYSTEM (75) Inventor: Ervin Weisz, Willowdale (CA)

(73) Assignee: Hub Transmission Patent Technologies Inc., Toronto (CA)

( * ) Notice: Subject to any disclaimer, the term of this patent is extended or adjusted under 35 U.S.C. 154(b) by 0 days.

(21) Appl. No.: 10/319,646

(22) Filed: Dec. 16, 2002

(65) Prior Publication Data

US 2003/0085065 A1 May 8, 2003

Related U.S. Application Data (63) Continuation of application No. 09/676,501, filed on Oct. 2, 2000, now Pat. No. 6,494,278.

(51) Int. Cl.[7] .............................. B60K 1/00; F16H 3/34
(52) U.S. Cl. ......................... 180/65.5; 180/907; 74/354
(58) Field of Search ............................. 180/65.5, 65.6, 180/65.7, 65.8, 907, 337, 342; 280/304.2; 318/60, 138, 488; 74/353, 354

(56) References Cited

U.S. PATENT DOCUMENTS

| 4,913,258 | A | * | 4/1990 | Sakurai et al. | 180/242 |
|---|---|---|---|---|---|
| 5,199,520 | A | * | 4/1993 | Chen | 180/65.5 |
| 5,236,055 | A | * | 8/1993 | Legal | 180/65.5 |
| 5,246,082 | A | * | 9/1993 | Alber | 180/65.5 |
| 5,495,904 | A | * | 3/1996 | Zwaan et al. | 180/11 |
| 5,581,136 | A | * | 12/1996 | Li | 310/67 R |
| 5,755,304 | A | * | 5/1998 | Trigg et al. | 180/65.5 |
| 5,796,192 | A | * | 8/1998 | Riepl | 310/67 R |
| 6,302,226 | B1 | * | 10/2001 | Kanno et al. | 180/6.5 |
| 6,321,863 | B1 | * | 11/2001 | Vanjami | 180/65.5 |
| 6,435,296 | B1 | * | 8/2002 | Arai | 180/243 |
| 6,494,278 | B1 | * | 12/2002 | Weisz | 180/65.5 |

* cited by examiner

Primary Examiner—Christopher P. Ellis
Assistant Examiner—Gerald B. Klebe
(74) Attorney, Agent, or Firm—Bereskin & Parr (57) ABSTRACT Motorized wheels in a wheelchair or other light vehicle are each mounted on an axle for limited rotation relative to a secondary connection to the frame of the vehicle which incorporates a sensor providing feedback which controls the motor according to torque sensed through the secondary connection. The motor and associated gearing and control circuitry are housed within a wheel hub of which a drum supporting a wheel rim is supported at its inner surface on multiple bearings spaced around its periphery.

1 Claim, 10 Drawing Sheets

ELECTRIC WHEELCHAIR DRIVE SYSTEM

This application is a continuation of application Ser. No. 09/676,501 filed Oct. 2, 2000; now U.S. Pat. No. 6,494,278B1 published Dec. 17, 2002.

FIELD OF THE INVENTION

This invention relates to motorized wheels for wheelchairs and other light vehicles, of the type in which an electric motor is built into the wheel hub, and to systems for the control of such wheels.

BACKGROUND OF THE INVENTION

U.S. Pat. No. 5,246,082 (Alber) discloses a motorized wheel for wheelchairs and the like, in which the wheel is designed to plug into a special socket on the wheelchair, and a hub against which the motor reacts is fixed relative to the frame by an arm, radially displaced from the axis of the hub, which fixes the hub to the frame of the chair.

U.S. Pat. No. 5,199,520 (Chen) discloses a wheelchair with motorized wheels, in which the wheel hubs are permanently secured to the frame of the chair, and the wheels are removable from the hubs.

Both of these arrangements permit the wheels of a wheelchair or other vehicle to be removed when the vehicle is folded or otherwise prepared for transportation, but, in each case, the vehicle must be specially adapted for this purpose, and the wheels are not directly applicable to a wheelchair or other vehicle of which the hub's driving wheels are secured in tubular journals incorporated in the frame of the vehicles. Moreover, more effective and efficient control of the motors in the prior art arrangements in order to minimize electricity consumption and provide optimum assistance to a user or driver of the vehicle would be desirable. It is also important that a motorized wheel designed for application to vehicles originally designed for human propulsion does not overstress the frame of the vehicle.

SUMMARY OF THE INVENTION

It is an object of the invention to provide a motorized wheel and controls therefor which can be applied to a vehicle, which can be readily removed from the vehicle, which is less likely to apply excessive stresses to the frame of the vehicle, and which permits improved control of the motor of the wheel.

According to the present invention in a first aspect, a motorized wheel for a vehicle has a hub portion, a drum supporting a rim and tire for rotation relative to the hub, the drum and hub having a common axis, the hub itself being rotatable about the common axis, a shaft by which the hub portion is mounted for pivotal motion on its axis relative to a frame of the vehicle, and a bracket mounted on the hub portion or shaft spaced from the axis, the bracket being disposed to engage a frame member of the vehicle to limit pivotal motion of the hub relative to the frame of the vehicle, the engagement being through a torque sensing device which generates signals indicative of the direction and magnitude of reaction forces between the bracket and the frame, a motor mounted within the hub portion and in driving connection with the drum portion, and a control device for the motor receiving the signals and applying feedback control to the motor according to the torque reaction developed between the wheel and the frame.

According to the present invention in a second aspect, a motorized wheel for a vehicle has a drum portion supporting a wheel rim, and a hub portion housing a drive motor within the drum in driving connection with the drum portion, the drum portion being mounted for rotational movement relative to an axis of the hub portion, which is mounted by a shaft to the vehicle, mounting of the drum portion on the hub portion being by means of plural roller bearings supported by the hub portion spaced around a periphery of the drum portion.

The invention also extends to a vehicle including at least one motorized driving wheel having a drum portion supporting a wheel rim, and a hub portion supporting a motor in driving connection with the drum portion, the drum portion being rotatable about the hub portion, a sensor sensing magnitude and direction of reaction forces applied to the hub by the rim portion and the motor, a battery for powering the vehicle, and a control unit receiving input from said sensor and a driver-operated control, the signals from the sensor being used to control the torque developed by the motor.

DESCRIPTION OF THE PREFERRED EMBODIMENTS

While the implementation of the invention is described with reference to a wheelchair, it should be understood that it is equally applicable to other vehicles such as trolleys, scooters, golf carts, etc., for which electrically powered wheel units are a suitable power source.

Referring to FIGS. 1–5, a wheel unit 1 comprises a stub axle 2 supporting a back plate 4 forming a hub. The stub axle is inserted into a tubular socket (not shown) in a frame of the wheelchair, in which it is retained by a nut and washer (not shown) on a threaded end 6 of the axle in a manner which allows at least limited rotational movement between the axle and the socket. A quick-release type lock to retain the axle may be used in place of a nut. Secured to the back plate through a spacer ring 8 by bolts 10 so as to form a chamber for an electric motor 17 is a further plate 12, which also supports a ring of peripheral roller bearing assemblies 14 which support for rotation a drum 16 forming the outer peripheral wall of a hollow chamber, closed on its outer face by a plate 18 connected through dogs 20 loaded by springs 22 to a drive gear 24 concentric with the axle 2. The dogs are moved radially in and out of engagement with the gear by a cam plate 26 operable by a manually-rotatable disc 27 mounted externally of the plate 18 so as to provide a clutch. The drive gear is journalled in the cam plates 26 by a bearing 28, and is secured by a bolt 30 to a shaft 32 journalled in bearings 34, 36 located respectively in the plate 12 and a further bracket 38 secured to the plate 12. A pinion 40 secured to a shaft 42 mounted in further bearings 44 in the plate 12 and bracket 38 drives the gear 24 and, in turn, is driven by a further gear 46 mounted on the shaft 42. A pinion 48 is mounted on yet a further shaft 50 journalled in bearings 52 in the plate 12 and bracket 38 is driven by a gear 54 also mounted on the shaft, which, in turn, is driven by a pinion 56 mounted on the shaft of the motor 11, the gears and pinions providing several stages of step-down gearing from the motor 11 to the drum 16.

Figure 1:
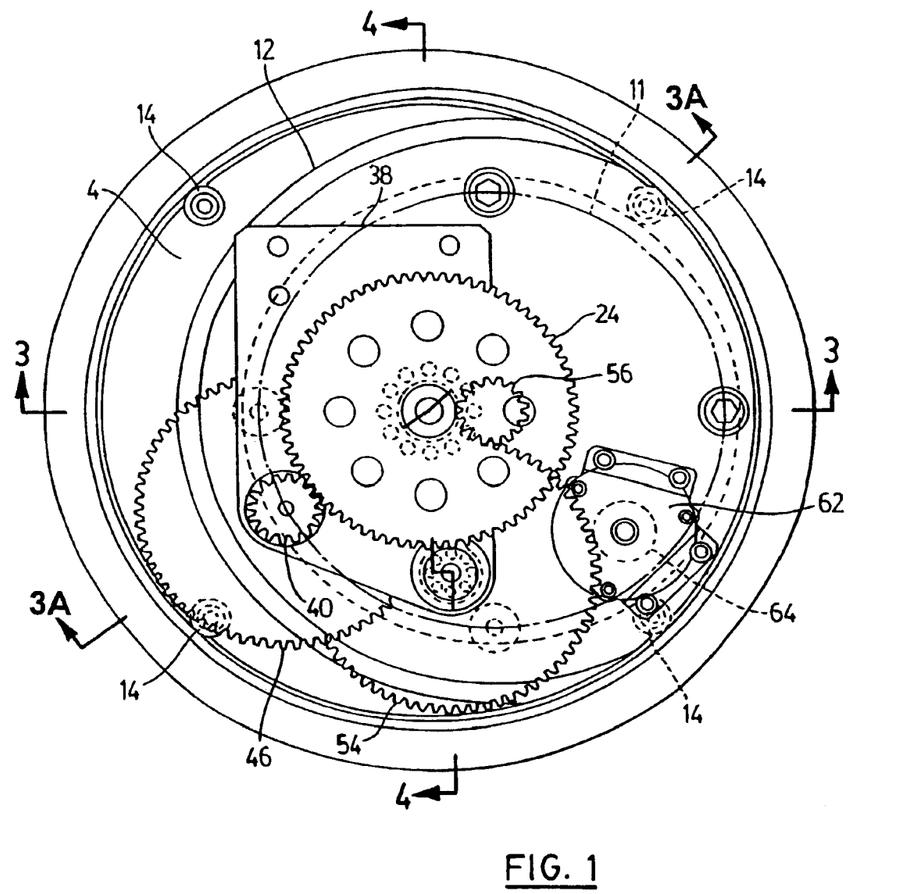
FIG. 1 is an elevation of a motorized wheel for a wheelchair, with clutch components removed so that internal gearing can be seen, and with rim and tire components omitted.
Figure 3:
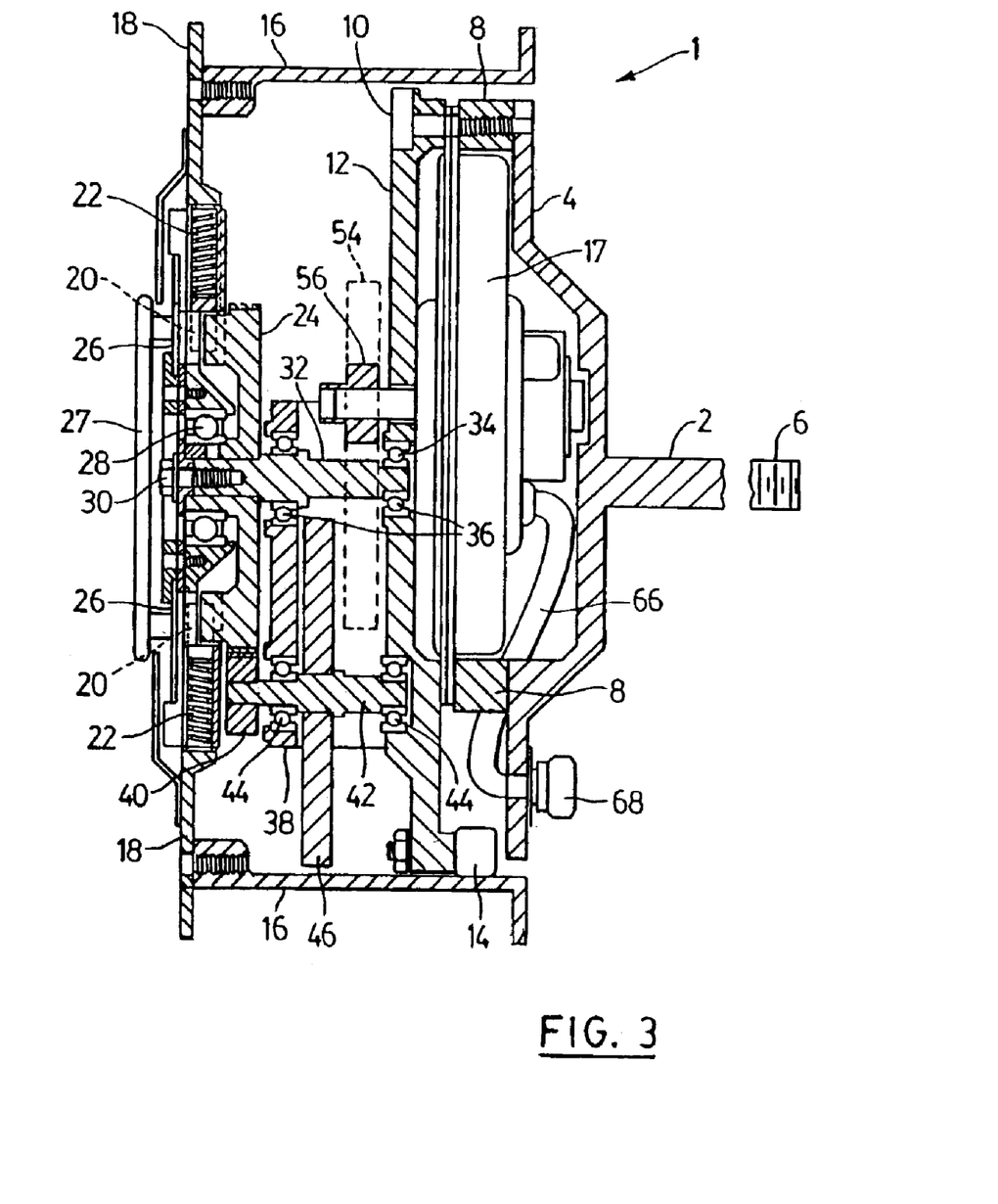
FIG. 3 is a cross-section on the lines 3—3 in FIG. 1, except for the clutch in which the section is on the lines 3A—3A.
Figure 4:
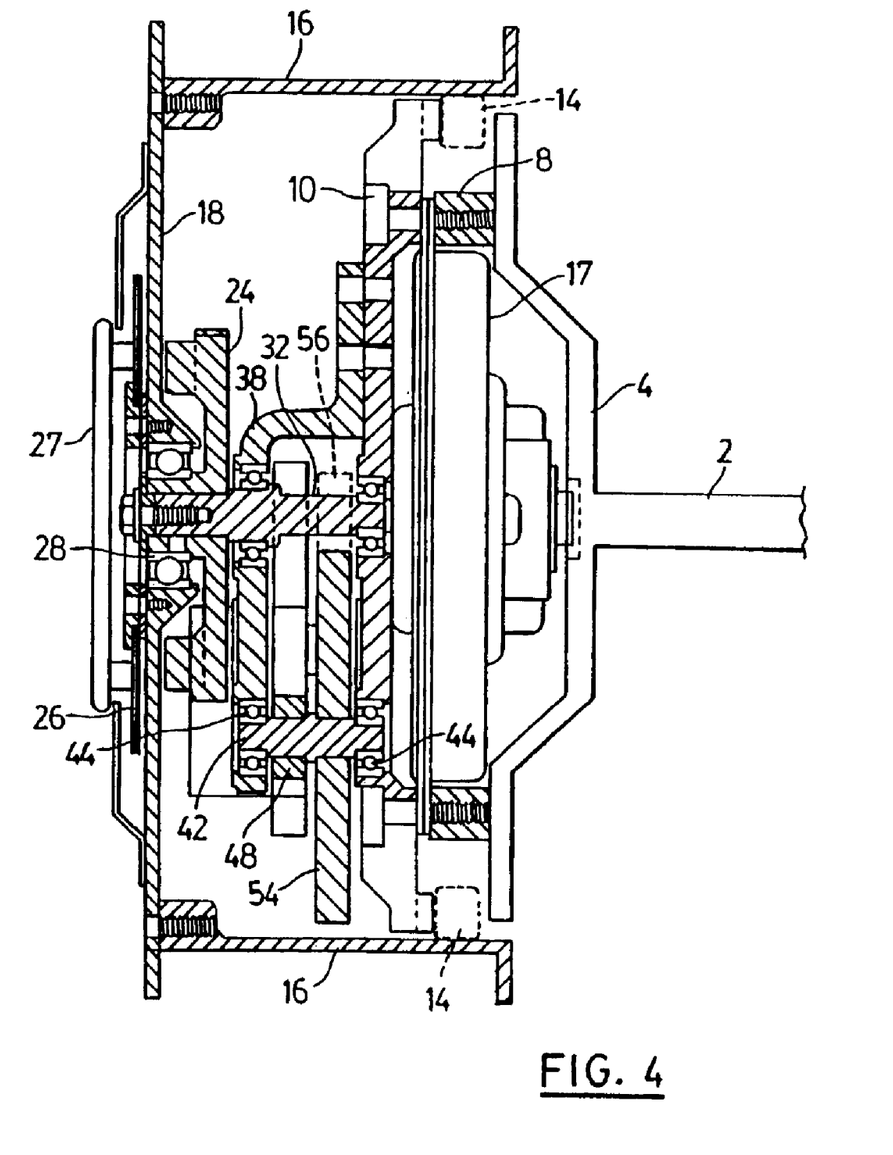
FIG. 4 is a cross-section on the lines 4—4 in FIG. 1.
Figure 5:
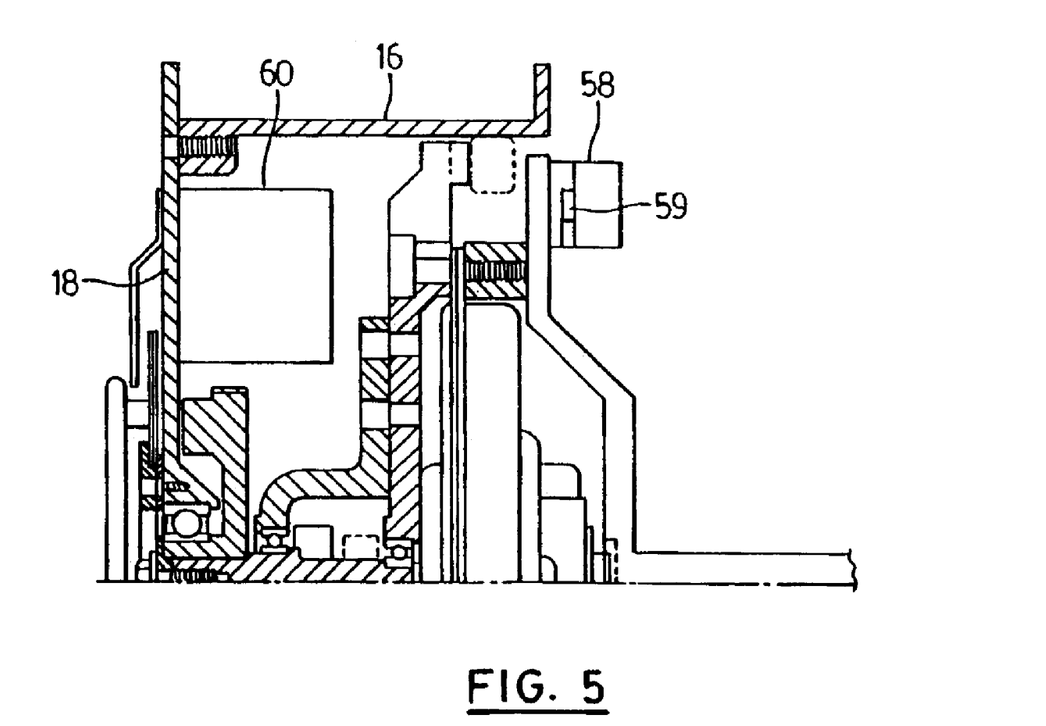
FIG. 5 is a partial cross-section on the line 5 in FIG. 1.

In an alternative arrangement (not shown), the drum 16, instead of being supported by the bearings 14, has an inwardly extending annular plate on the side of the wheel carrying shaft 2, supported by an annular bearing on a central portion of the plate 4.

Figure 2:
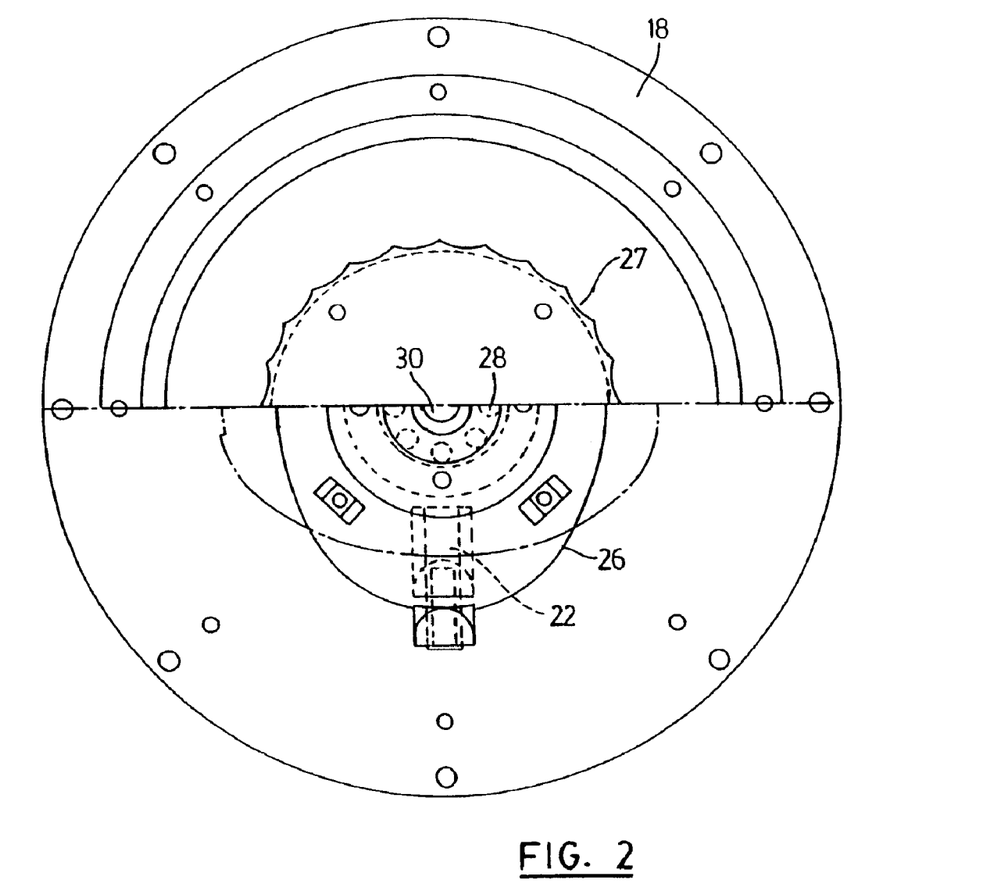
FIG. 2 is a corresponding elevation with the clutch components in place (upper half) and partially cut away (lower half)

Mounted outside of the back plate 4 is a fork 58 incorporating a sensor 59, to be described further below. When the term sensor is utilized, it is intended to mean a sensor selected from the group of, a load cell, a strain gauge, a torque sensor, and comparable units for sensing torque. Mounted on the plate 18 within the drum 16 are a control unit 60 and an electromagnetic brake unit 62 acting through a pinion 64 on the gear 54. Electrical cabling 66 extends from a socket 68 mounted on the plate 4 to the motor 17, the control unit 60, the sensor 59, and the brake unit 62.

Figure 6:
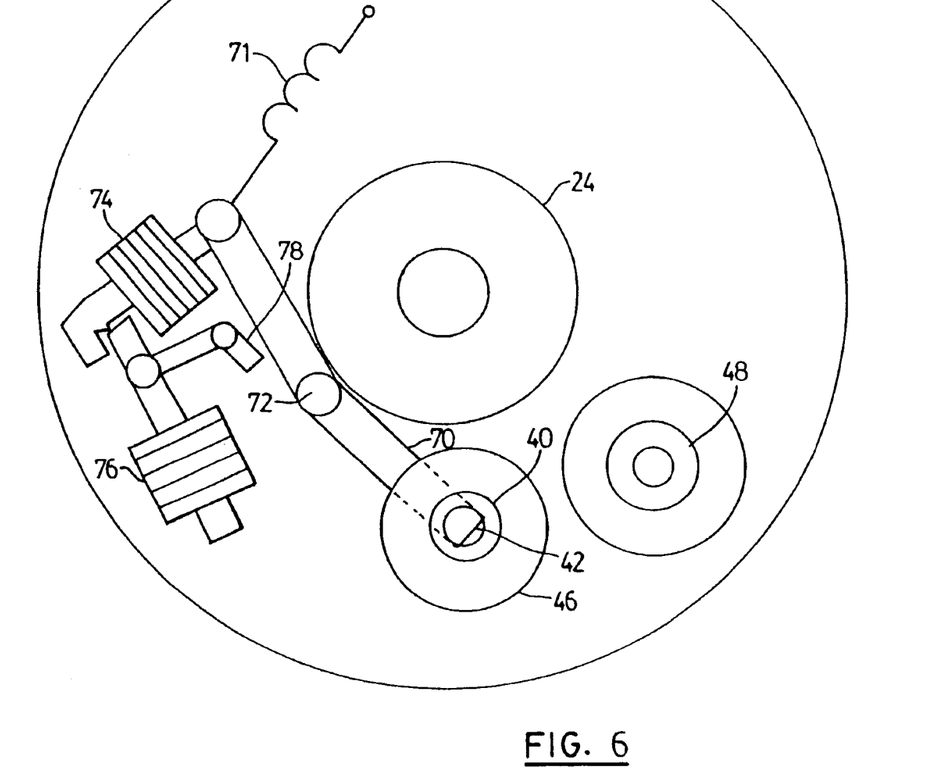
FIG. 6 diagrammatically illustrates an alternative clutch arrangement.

In an alternate clutch arrangement shown in FIG. 6, the shaft 42 supporting gear 46 and pinion 40 is journalled in a lever arm 70 pivoted at 72 to the plate 12, an opposite end of the lever arm 70 being loaded by a spring 71 to bias the lever arm to a position in which the gear 46 is disengaged from the pinion 48 and the pinion 40 from the gear 24. A solenoid 74 moves the gear 46 and pinion 40 into engagement. Solenoid operated and manually operated latching devices 76 and 78 are provided to latch the solenoid in a position in which the gear and pinion are engaged and may be operated to release the solenoid and thus allow the gear and pinion to disengage.

Figure 7A:
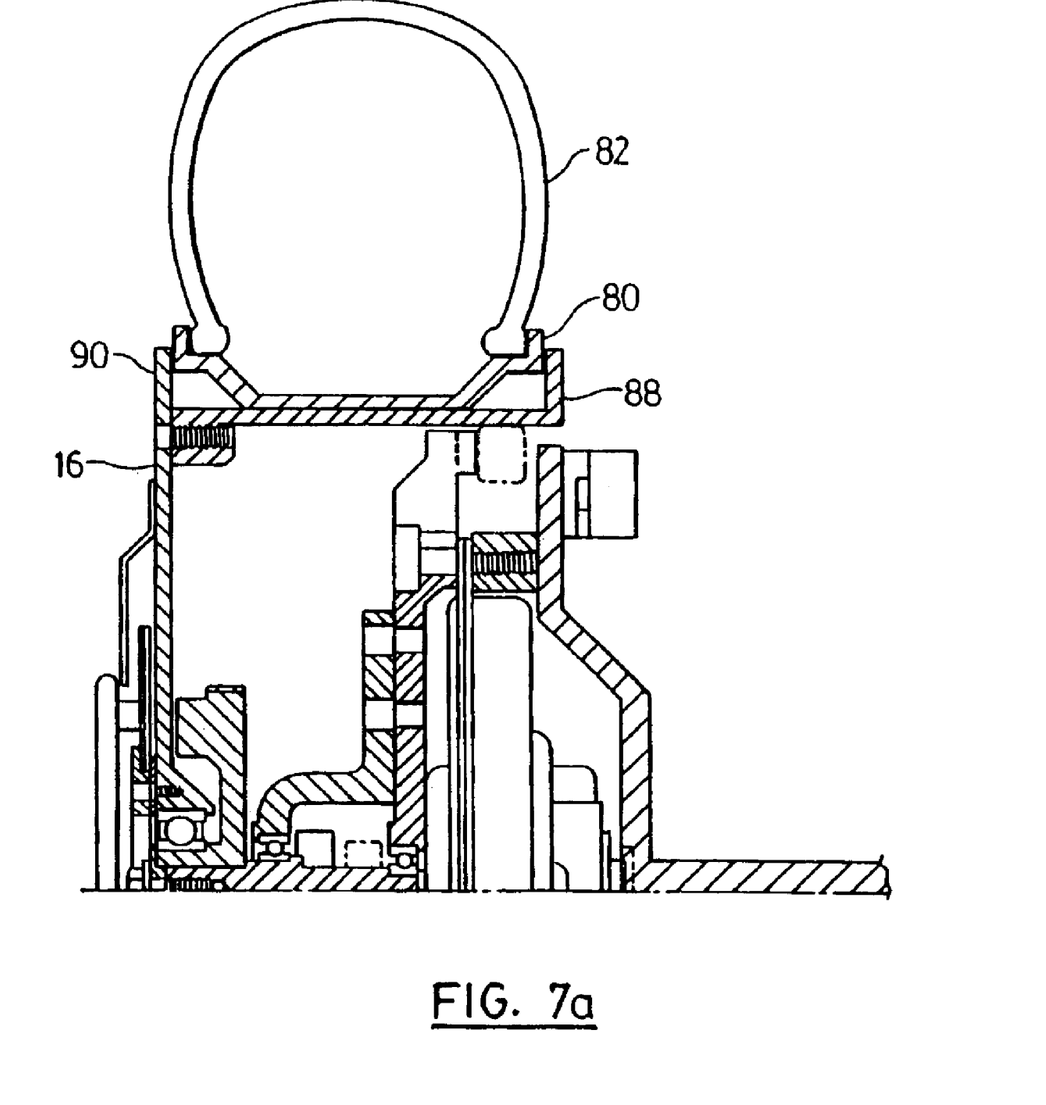
FIGS. 7A and 7B are fragmentary cross-sections illustrating alternate means of mounting a rim and tire on the wheel.
Figure 7B:
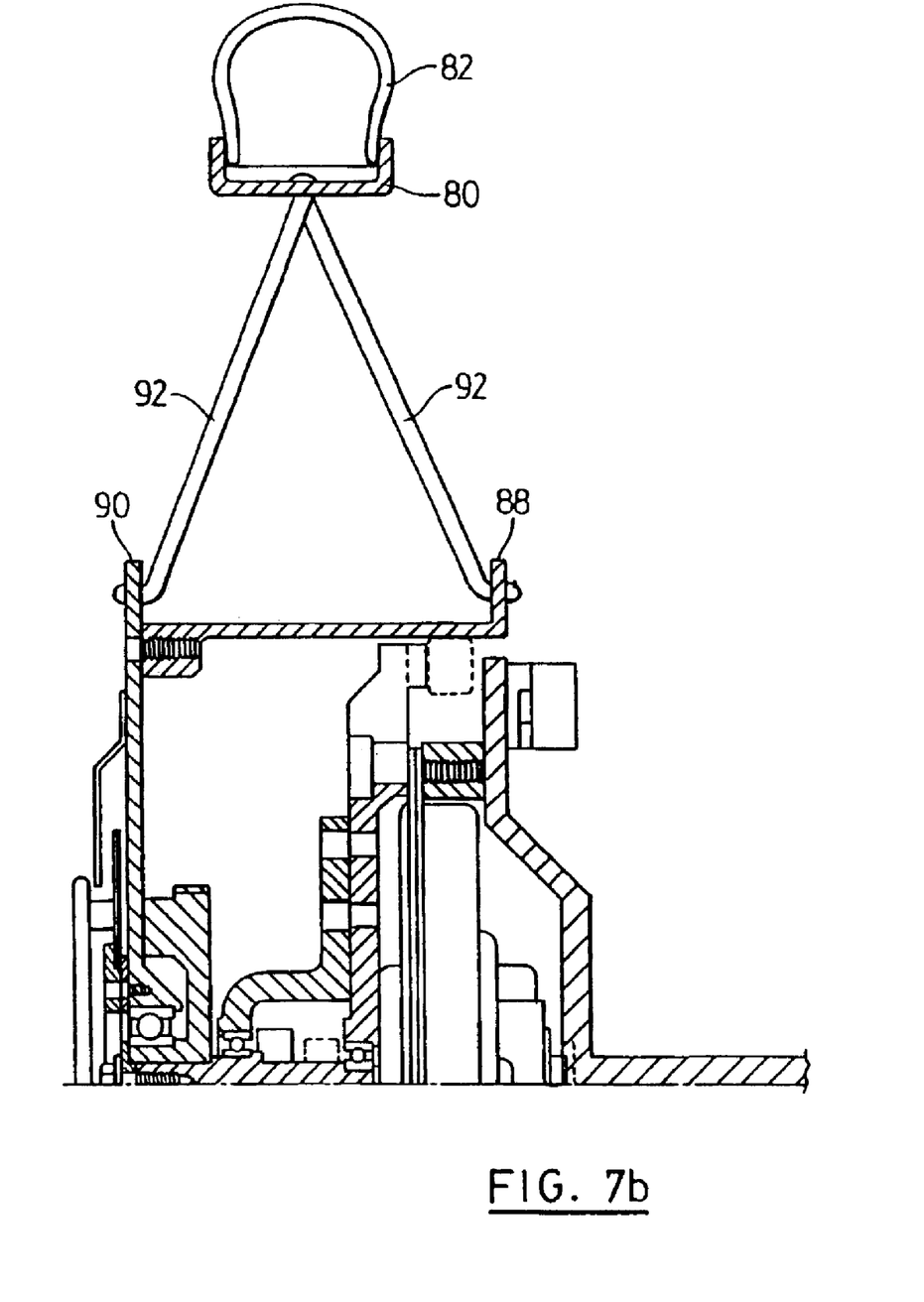

Referring now to FIGS. 7A and 7B, these show two examples of ways in which a rim 80 carrying a pneumatic tire 82 may be mounted on the hub 16. In FIG. 7A, the rim 80 carrying the tire 82 is clamped between a flange 88 on the plate 16 and a flange 90 on the plate 18. In FIG. 7B, the rim 80 is secured by spokes 92 having end portions extending through the flanges 88 and 90 and the rim 84.

Figure 8:
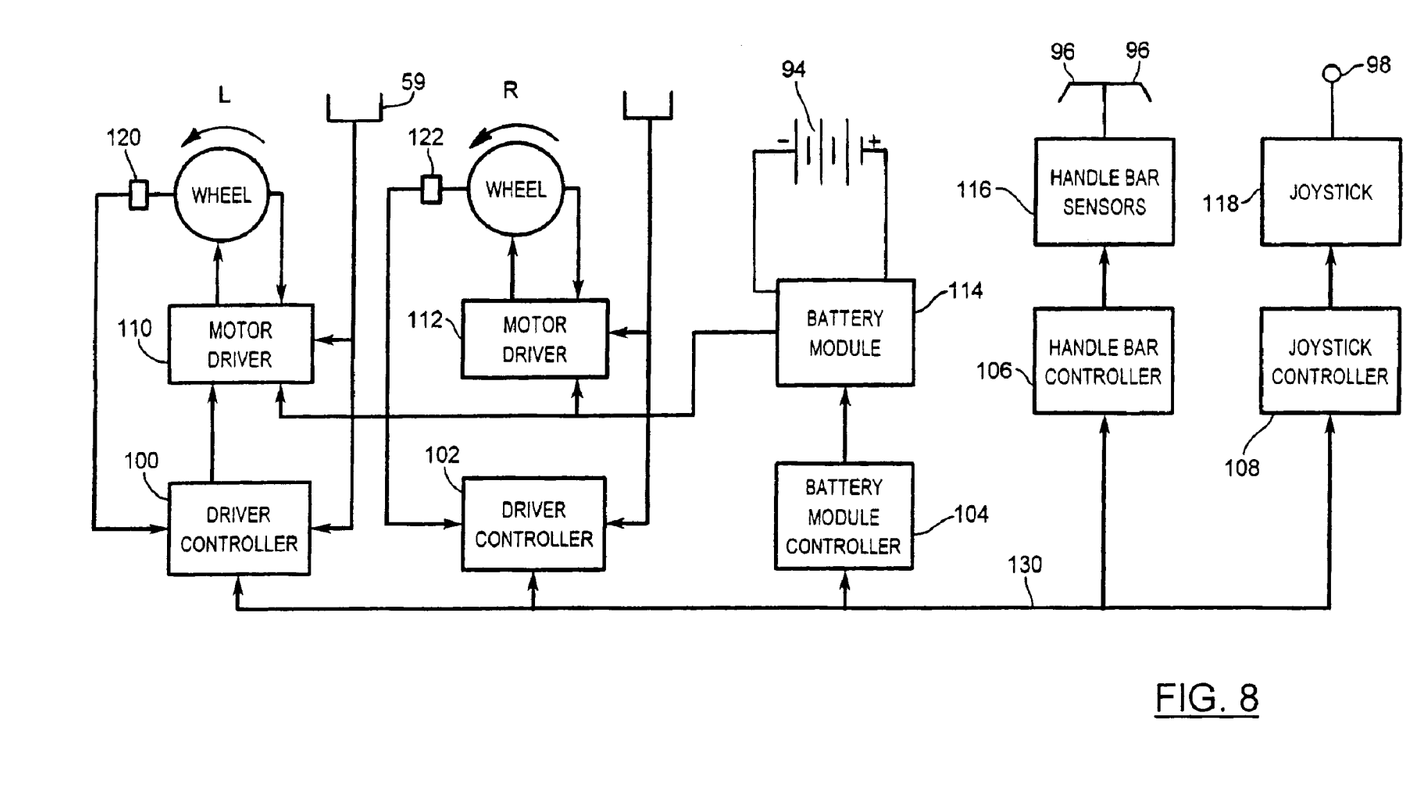
FIG. 8 is a block diagram of the electrical and electronic systems of a wheelchair incorporating the invention.
Figure 9:
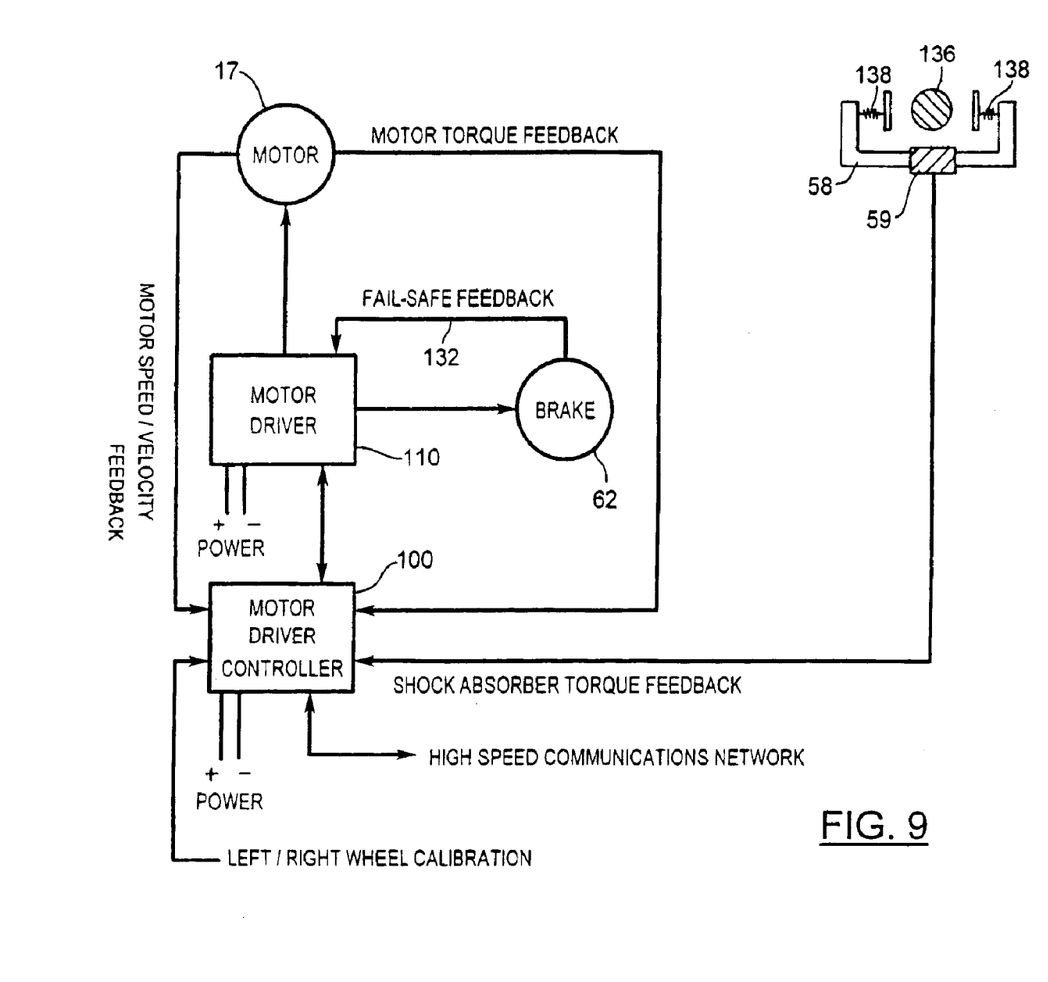
FIG. 9 is a block diagram of a control system for a single wheel, showing one version of a sensor fork for engaging a frame member of the wheelchair.

FIG. 9 is a block diagram of the electrical circuits of a wheelchair incorporating wheels L and R, constructed as already described. The wheelchair further incorporates a battery 94, handlebars 96 and an occupant-accessible joystick control 98. Power supply circuits are provided from the battery module to the electronic circuit blocks (not shown). The circuits comprise five main subassemblies, each of which includes a control circuit conveniently implemented by appropriately programmed digital signal processors (DSP) 100, 102, 104, 106 and 108. The motors of two wheel units L & R receive power from driver circuits 110 and 112 under control of the DSPs 100 and 102 which receive speed data from tachometers 120 and 122 associated with the wheels, and torque data from the sensor 59, as well as receiving and transmitting data on a network connection 130. The DSP 104 controls a battery module 114 which supplies power to the entire system including the drivers, 110 and 112, from the battery 94. The DSP 106 receives control signals from sensors 116 associated with handlebars 96 of the wheelchair. The DSP 108 receives control signals from sensors 118 associated with a joystick 98 operable by a user of the wheelchair. All of the DSPs communicate through the network 130.

Referring to FIG. 9 which shows in more detail the circuits associated with a single wheel L, the motor driver 110 also provides power to actuate the brake unit 62, a feedback circuit 132 ensuring that the brake and the motor are not actuated simultaneously. A circuit 134 provides motor torque data to the DSP 100, in addition to data as to the restraining torque sensed by the sensor 59 associated with the fork 58 which act in a frame member 136 of the wheelchair through shock-absorbing springs 138. In an alternative arrangement shown in FIG. 10, the fork 58, instead of being mounted on the backplate 4, is mounted on a resilient radial arm 142 incorporating the sensor 59 and extending from a hub 140 keyed to the stub axle 2.

In use, the wheel DSPs 100 and 102 are programmed to respond to movements of the handlebars 96 or joystick 98, as communicated over the network 130, in an appropriate manner, with forward pressure on the handlebars or joystick being translated proportionately into acceleration of the wheels 1 such as to accelerate the wheelchair forward, backward pressure producing rearward acceleration, and sideways movement of the joystick or differential pressure on the handlebars resulting in differential control of the motors so as to steer the wheelchair to left or right. The brake unit 62 is applied to decelerate or stop the chair when speed is too low for regeneration in the motor to produce adequate deceleration, the drive 110 accommodating regenerative braking to return energy to the battery as permitted by the control unit 114. Incorporation of the control units 60 into the wheels saves losses in the cables connecting the battery to the wheels.

Figure 10:
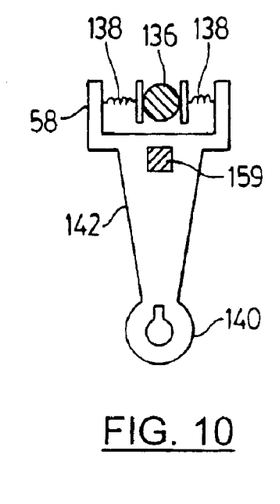
FIG. 10 shows an alternative embodiment of sensor fork.

The sensors 59/159 sense the direction and magnitude of the reaction forces between the wheel and the frame of the wheelchair and thus, as well as sensing the torque reaction between the wheels and the wheelchair frame and thus allowing the motors of the wheels to be controlled to alter the motor torque to maintain the torque reaction at a level appropriate to the signals received from the handlebars or the joystick. Additionally, the motors (and optionally the brakes) can be controlled to limit the stresses applied to the frame members 136.

Each embodiment of clutch enables the rim portion of its wheel to be released from driving connection with the hub portion, so that the wheelchair can be operated manually in the event that motor drive is not required, or not available due to a discharged battery or other failure.

The above embodiment of the invention is exemplary only, and variations, both as to the type of vehicle to which the invention is applied, and as to implementation of the invention, are possible within the scope of the appended claims.

I claim:

1. A kit of components to adapt a manual powered wheel based unit to a dual mode unit having a manual mode of operation and a motor assisted mode of operation, comprising a motorized wheel for a vehicle comprising a hub portion, a drum supporting a rim and tire for rotation relative to the hub portion, the drum and hub having a common axis, the hub itself being rotatable about the common axis, a shaft by which the hub portion is mounted for pivotal motion on its axis relative to a frame of the vehicle, and a bracket mounted on the hub portion or shaft spaced from the axis, the bracket being disposed to engage a frame member of the vehicle to limit pivotal motion of the hub relative to the frame of the vehicle, the engagement being through a torque sensing device, for sensing the torque applied on the bracket which generates signals indicative of the direction and magnitude of reaction forces between the bracket and the frame, a motor mounted on the hub portion and in driving connection with the drum, and a control device for the motor receiving the signals and applying feedback control to the motor according to the torque reaction developed between the wheel and the frame, including a clutch in driving connection between the drum and the hub portion.

* * * * *